United States Patent [19]
Ito et al.

[11] Patent Number: 4,956,787
[45] Date of Patent: Sep. 11, 1990

[54] ELIMINATION WORK SIMULATOR APPARATUS

[75] Inventors: Kumiko Ito, Mito; Yasumasa Kawashima, Hitachi; Shiro Nonaka, Hitachi; Tomotoshi Ishida, Hitachi, all of Japan

[73] Assignee: Hitachi, Ltd., Tokyo, Japan

[21] Appl. No.: 243,640

[22] Filed: Sep. 13, 1988

[30] Foreign Application Priority Data

Sep. 21, 1987 [JP] Japan .................. 62-234988

[51] Int. Cl.⁵ .......................................... G06F 15/46
[52] U.S. Cl. ........................ 364/474.24; 364/512; 364/518; 364/578
[58] Field of Search ........... 364/474.2, 474.24, 474.26, 364/474.29, 474.15, 578, 512, 514, 518, 521, 522, 188–193; 340/723, 724, 732, 734

[56] References Cited

U.S. PATENT DOCUMENTS

| | | | |
|---|---|---|---|
| 4,736,306 | 4/1988 | Christensen et al. | 364/474.24 X |
| 4,757,461 | 7/1988 | Stohr et al. | 364/512 |
| 4,791,579 | 12/1988 | Kranitzky | 364/474.24 X |
| 4,792,889 | 12/1988 | Kragelin et al. | 364/474.24 X |
| 4,833,617 | 5/1989 | Wang | 364/578 X |

FOREIGN PATENT DOCUMENTS

| | | |
|---|---|---|
| 129091 | 12/1984 | European Pat. Off. . |
| 153556 | 9/1985 | European Pat. Off. . |
| 166783 | 1/1986 | European Pat. Off. . |
| 2140937 | 12/1984 | United Kingdom . |

OTHER PUBLICATIONS

Meacher–"Geometric Modeling Using Octree Encoding"–Computer Graphics and Image Processing 19, pp. 129-147; Academic Press; 1982.
Van Hook–"Real-Time Shaded NC Milling Display"–ACM Siggraph, vol. 20, No. 4, pp. 15-20; 1986.
Okino–"Methodology of Automatic Design"–Yokendo; pp. 88-90, 133, 134; 1982.
Kawai–"Basic Graphics"–Shokodo–pp. 186-188; 1985.

Primary Examiner—Joseph Ruggiero
Attorney, Agent, or Firm—Antonelli, Terry, Stout & Kraus

[57] ABSTRACT

An elimination work simulator has not only a difference operation processor to attain a difference between work object space data and work space data but also a product operation processor to execute a product operation therebetween. Elimination work space data outputted from the product operation processor is sequentially stored; and at least the latent data of the work object space data outputted from the difference operation processor is stored so as to minimize the amount of data to be preserved. When displaying the work object space data, an animation displaying thereof can be conducted in the same or opposite direction of the order of the work operations by appropriately using elimination work space data and work object space data.

20 Claims, 13 Drawing Sheets

61 ELIMINATION WORK SPACE TABLE AREA

62 ELIMINATION WORK SPACE DATA AREA

| WORK OPERATION | 2 | 4 |
|---|---|---|
| WORK OBJECT SPACE DATA Wj | W2 | W4 |

FIG. 19

$W_2 \cup C_2$

FIG. 20
(PRIOR ART)

ELIMINATION WORK SIMULATOR APPARATUS

BACKGROUND OF THE INVENTION

The present invention relates to an elimination work simulator, and in particular, to an elimination work simulator capable of storing data of a shape or contour as a final result of the work and data of a shape as an intermediate result of the work.

A conventional elimination work simulator apparatus has been described in pages 120 to 147 of the Computer Graphics And Image Processing 19, (1982). In this article, there is described an example in which a space data format called an octtree is applied to a numeric control (NC) work simulator. Although a method of computing a contour or shape as a result of a work has been described, a preservation or storage of the simulation result, particularly, the handling of information about intermediate results of the simulation has not been described.

In addition, a conventional elimination work simulator apparatus has been described also in pages 15 to 20 of the ACM Siggraph '86, Volume 20, Number 4. In this article, an operation of sets and a display operation are achieved by use of a data store method called DEXEL; however, since the result of the operation of sets is updated for each work operation in this processing, the intermediate results of the simulation are not preserved.

Figure 20:
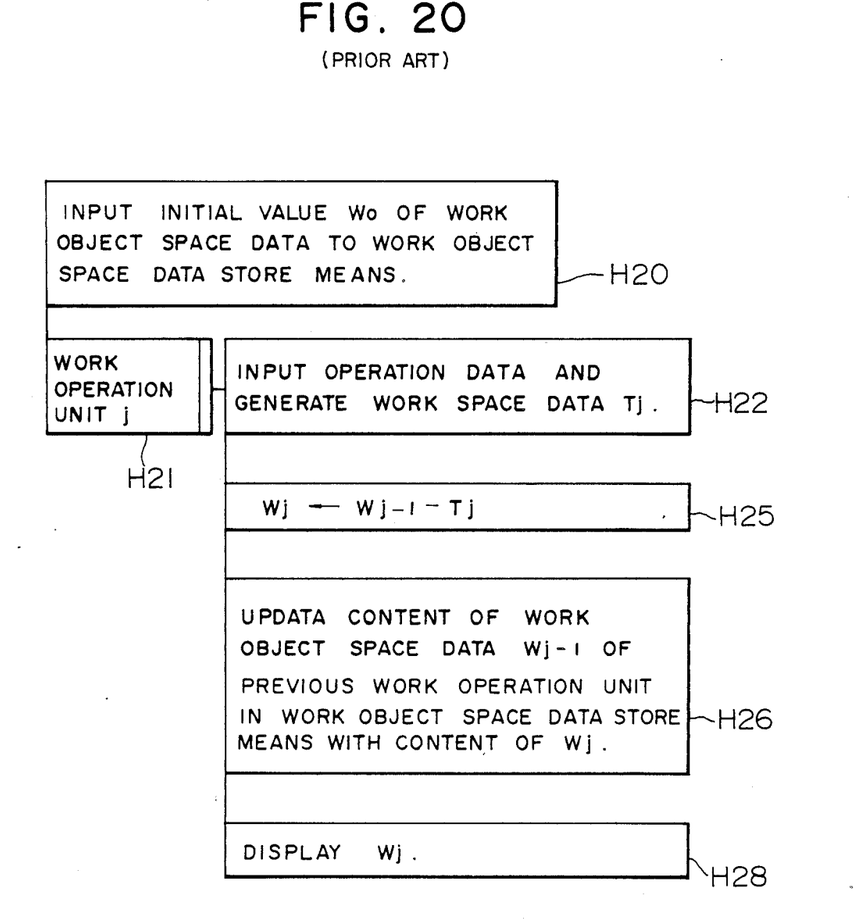
FIG. 20 is a flowchart for explaining the operation of a conventional apparatus.

Referring now to the flowchart of FIG. 20, a flow of processing effected in a conventional elimination work simulator apparatus will be described. In the description, it is assumed that, when a work is effected in m work operation units of a working or machining device, work object space data associated with the work object or workpiece to be worked in a j-th work operation unit is represented as $W_{j-1}$ and work space data is expressed as $T_j$.

First, in step H20, an initial value $W_0$ of the work object space data is supplied to work object space data store means. Next, in step H22, operation data is inputted to each work operation unit so as to generate working space data $T_j$. Furthermore, step H25 effects an operation to attain a difference between the work object space data $W_{j-1}$ associated with the preceding work and the work space data $T_j$ generated in the step H22 and then step 26 updates the result of the step H25 to attain new work object space data; thereafter, the result of the update is displayed in step H28.

In general, when performing a visual check on the appearance or state of a work object of an elimination work conducted by an elimination work simulator, if the display indicates a failure of work object space data up to a certain work operation unit, it is desirable to determine, in a short period of time, in which one of the work operation units a work failure has been caused and to display the work state for each work operation unit. In order to satisfy such a requirement, it is naturally necessary that the changing state of the work object in the elimination work simulator can be continuously displayed in the forward direction of the work operation as well as in the backward direction thereof; furthermore, that the work state of an arbitrary work operation unit can be directly displayed. However, in the conventional elimination work simulator described above, only the forward-directional processing is effected and hence in order to redisplay a state of a work object in a work operation unit i which precedes the present work operation unit j, the entire processing ranging from the first work operation unit to the (i−1)-th work operation unit is required to be executed again. In consequence, the prior art apparatus is attended with a problem that it takes a long period of time to redisplay the state of the work object in the work operation unit i. As a simple method to solve this problem, there is considered a method in which the work object space data $W_j$ attained in each work operation unit is preserved so as to display the whole or a part of the data when necessary. In this case, there arises a problem that the capacity of the storage required for this operation is considerably increased.

SUMMARY OF THE INVENTION

It is therefore an object of the present invention to provide an elimination work simulator apparatus capable of preserving, in a small amount of data, work object space data and elimination work space data in an arbitrary work operation unit, thereby solving the problem above.

Another object of the present invention is to provide an elimination work simulator apparatus with a small amount of data preservation capable of effecting at a high speed a display of work object space data in an arbitrary work operation unit and an animation display of the state of a work object under a work in the forward and backward directions.

According to the present invention, the objects above are achieved in a set operation processor of an elimination work simulator comprising, in addition to a difference operation processor similar to one utilized in the prior art, a product operation processor and an elimination work space data storage preserving a result of a product operation.

According to the present invention, the elimination work simulator apparatus includes not only a processor to compute a difference between work object space data and working space data but also a processor to compute a product therebetween; furthermore, the latest work object space data as a result of the difference operation and the elimination work space data as a result of the product operation are stored in the respective storages. That is, in place of an operation to preserve a great amount of work object space data associated with all work operation units, there is preserved a small amount of data including the latest work object space data and the elimination work space data of each work operation unit which are mutually prime space data; in consequence, the amount of the preserved data is minimized.

In addition, according to the present invention, since two kinds of data described above are preserved as work information, work object space data of an arbitrary work operation unit can be displayed at a high speed by use of the data thus preserved; moreover, an animation display can be achieved at a high speed in the forward and backward directions by repeatedly effecting the display of the arbitrary work operation unit.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Referring now to the drawings, description will be given of an embodiment according to the present invention.

Figure 1:
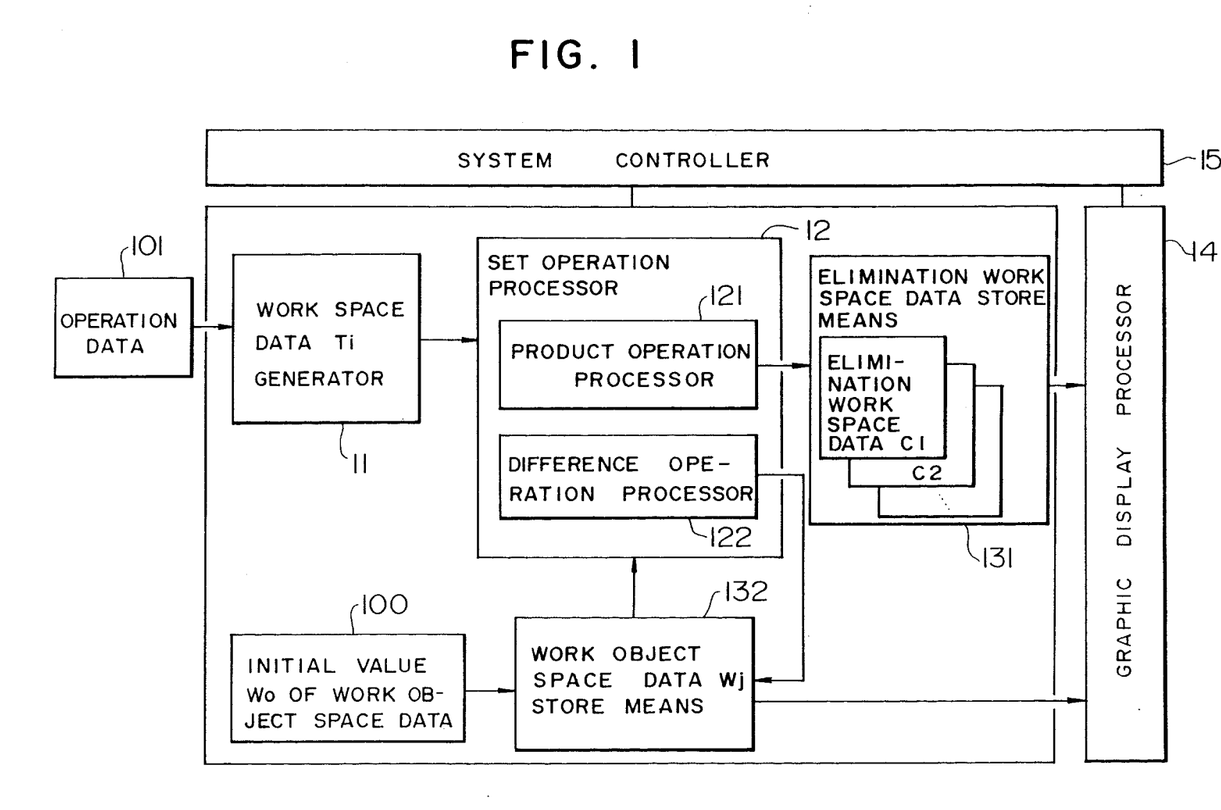
FIG. 1 is a block diagram schematically showing the configuration of an embodiment according to the present invention.

FIG. 1 is a block diagram showing a configuration example of an elimination work simulator as an embodiment according to the present invention, The constitution of FIG. 1 includes initial value data 100 of a work object space, data 101 representing a work operation, a work space data generator 11; a set operation processor 12, elimination work space data store means 131 as the second store means, work object space data store means 132 as the first store means, a graphic display processor 14; and a system controller 15 to control these components above. In addition, the set operation processor 12 comprises a product operation processor 121 and a difference operation processor 122.

Furthermore, the space data to be handled here is of n dimensions ($n \geq 2$).

Figure 2:
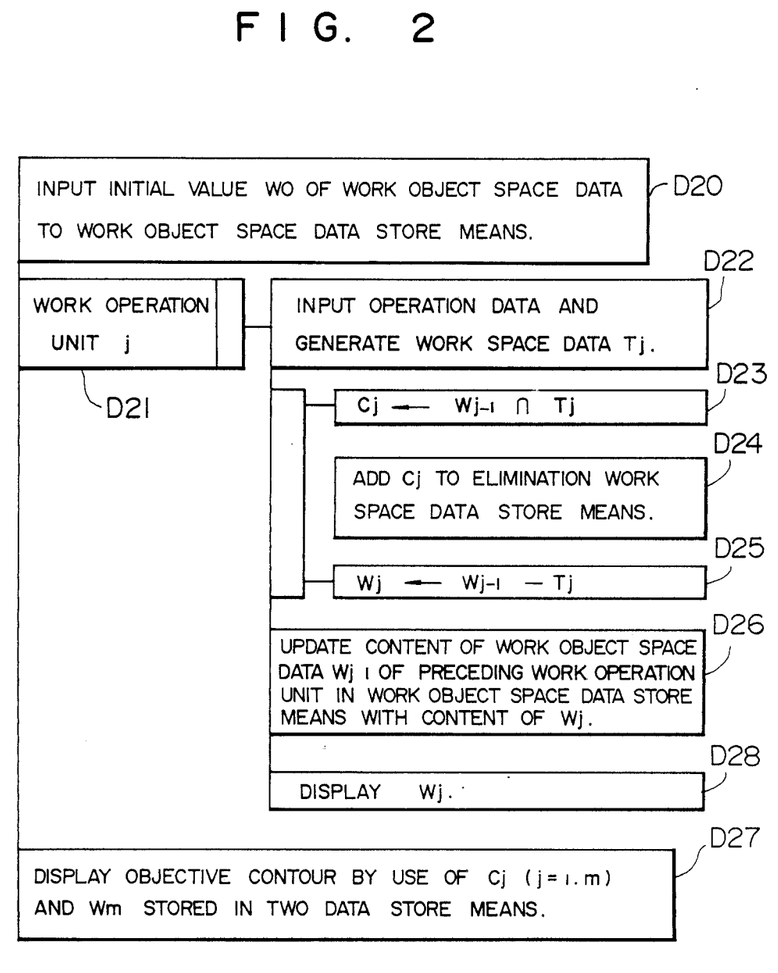
FIG. 2 is a flowchart useful to explain the operation of the embodiment of FIG. 1.

FIG. 2 is a flowchart for explaining the operation of the embodiment of FIG. 1. Referring next to FIG. 2, description will be given of a flow of the processing in the elimination work simulator of the embodiment of FIG. 1. Assume here that when a work is effected through m work operation units of a working or machining device, work object space data associated with a work object in the j-th work operation unit is $W_{j-1}$, work space data corresponding to a space through which the machining device passes is represented as $T_j$, and elimination work space data associated with the elimination of the work object space by the machining device is $C_j$, where j indicates an order number of the work operation unit assigned to the machining operation j.

(1) First, in step D20 of FIG. 2, a value $W_0$ of the initial data 100 associated with the work object space of FIG. 1 is inputted to the work object space data store means 132.

(2) Next, in step D21, control is transferred to processing related to each work operation unit j. First, in step D22, operation data of the work operation unit j is inputted to generate work space data $T_j$.

(3) Thereafter, in step D23, a product is computed between the work object space data $W_{j-1}$ and the work space data $T_j$ produced in the step D22, and then the product result is outputted to the elimination work space data store means 131 for an addition of the data. In addition, in parallel with the processing of the step D23, a difference is computed between the work object space data $W_{j-1}$ and the work space data $T_j$ generated in the step D22 so as to assume the result to be the work object space data $W_j$ of the present work operation unit.

(4) Furthermore, in step D26, the content of the work object space data $W_{j-1}$ of the preceding work operation unit in the work object space data store means 132 is updated to be the content of $W_j$ thus produced. Thereafter, the value of j is updated in the step D21 and then control is passed to processing related to the next work operation unit. When the processing above is completed for all work operation units, the work object space data store means 132 is as a result loaded with the final work result $W_m$, whereas the elimination work space data $C_j$ ($j = 1, m$) of all work operation units are accumulated in the elimination work space data store means 131.

(5) In step D27, the worked or machined state of the work object is displayed by use of the data stored in the two store means. Moreover, if a step D28 to display $W_j$ is added so as to follow the step D26, the display processing is also achieved together with the set operation.

Figure 3:
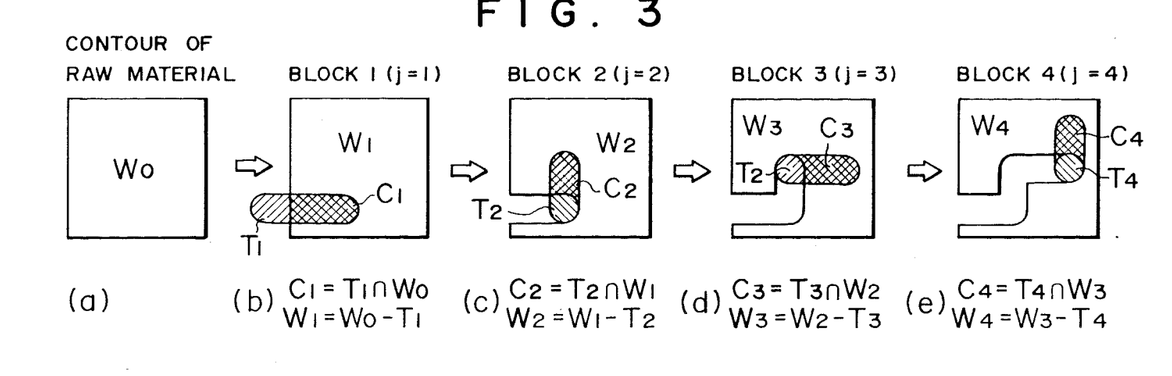
FIGS. 3 to 5 are schematic diagrams for explaining data of work processes in a case of a numeric control cutting work simulator.

Next, description will be given of a case where a numeric control machining work is simulated by use of the elimination work simulator of FIG. 1. In this situation, the work object space is a contour of a raw material or workpiece, the work operation unit corresponds to a numeric control instruction block, a machining device is a machine tool, and the work space is associated with a tool envelope body comprising a space through which the tool passes during the 1-block operation. FIG. 3 shows a data example associated with a set operation processing in the apparatus of the embodiment. For simplification of explanation, it is assumed here that the contour as the object of the work is of two dimensions and the number of the working or machining operations is four.

Figure 4:
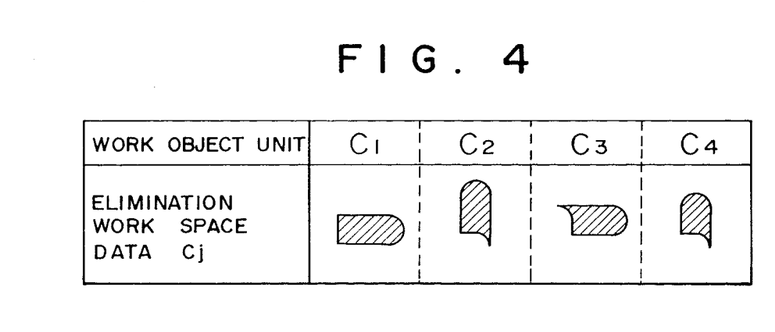
Figure 5:
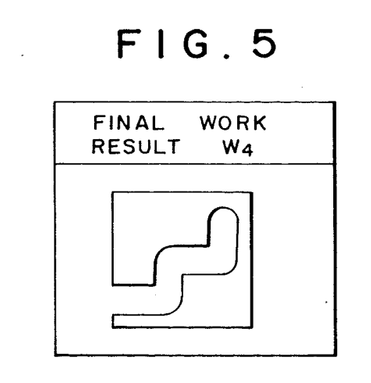

Referring next to FIG. 3, description will be given of the processing in the apparatus of the embodiment. In (a) to (e) of FIG. 3, $W_0$ is the processing data 100 of the work object space of FIG. 1 and represents the initial data of the contour of the raw material. Next, control is passed to a work operation of block 1. First, the tool locus data $T_1$ generated by the work space data generator 11 and $W_0$ are respectively subjected to the product operation $W_0 \cap T_1$ and the difference operation $W_0 - T_1$ in the product operation processor 121 and the difference operation processor 122 of FIG. 1. The result of the product operation is then supplied to the elimination work space data store means 131; whereas the result of the difference operation is outputted as the latest work object space data to the work object space data store means 132. The processing associated with the second and subsequent blocks is accomplished by repeatedly effecting the operation above. As a result, the elimination work space data of FIG. 4 is stored in the elimination work space data store means 131; whereas the final work result of FIG. 5 is accumulated in the work object space data store means 132.

Figure 6:
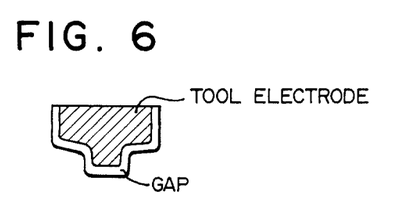
FIGS. 6, 7(a) and 7(b) are schematic diagrams for explaining data of work processes in a case of an electric discharge machining simulator.
Figure 7A:
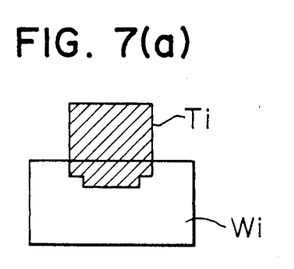
Figure 7B:
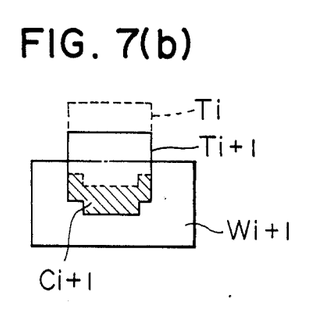

Next, description will be given of a case where the elimination work simulator is applied to an electric discharge machining. In this case, the work unit is to be effected in a predetermined fixed period of time determined and the work space corresponds to a space occupied by the tool electrode and the gap between the tool electrode and the raw material as shown in FIG. 6. In (a) and (b) of FIG. 7, there are shown an operation example of the simulation of the electric discharge machining effected from time i to time i+1. Assuming in (a) of FIG. 7 that the work object space as a result of the cutting operation of the work space $T_i$ at time i is $W_i$ and that the work space $T_{i+1}$ effects a machining operation on $W_i$ at time i+1, the product between $W_i$ and $T_{i+1}$ is denoted as the elimination work space data $C_{i+1}$ and the new work object space is represented as $W_{i+1}$.

Figure 8:
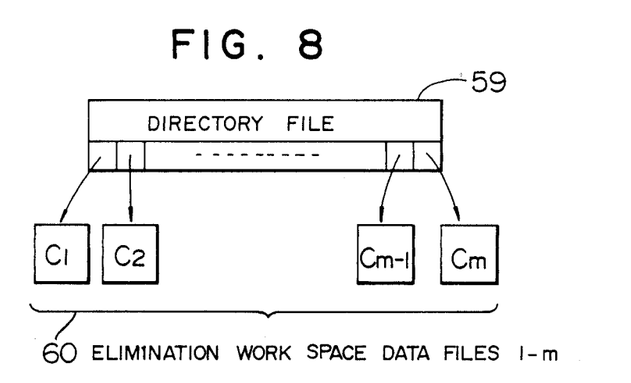
FIG. 8 is a diagram showing a configuration example of means for storing elimination work space data in a case where an external file is employed.

Next, description will be given of two embodiments associated with the elimination work space data store means 131 of FIG. 1. FIG. 8 shows an embodiment of the elimination work space data store means including a directory file 59 and m elimination work space data files 60. In this embodiment, the respective elimination work space data $C_j$ (j=1, m) are controlled by use of the directory file 59. Since an external storage is adopted in this embodiment, there is attained an effect that the system can cope with an increased amount of data, for example, in a case where a great amount of contour data is produced.

Figure 9:
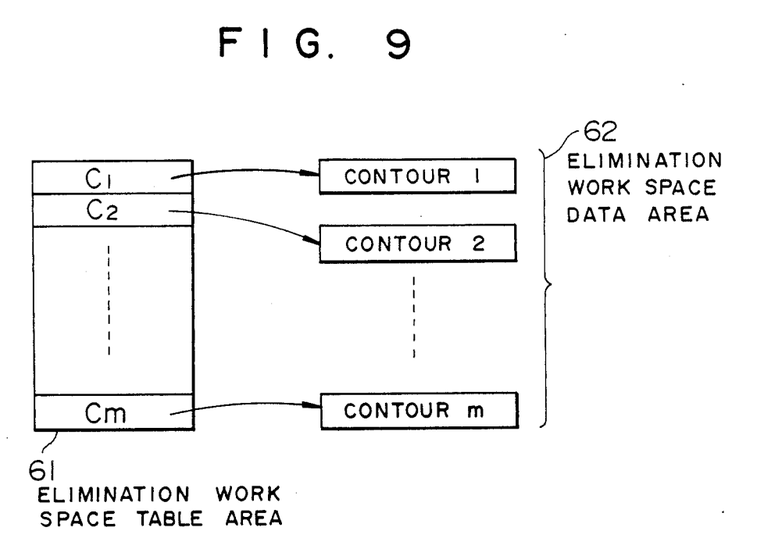
FIG. 9 is a diagram showing a configuration example of means for storing elimination work space data in a case where an internal memory is employed.

In addition, FIG. 9 shows an alternative embodiment of the elimination work space data store means 131 implemented in a memory integrated in a computer. In this embodiment, there is disposed a table area 61 for controlling the elimination work space data such that pointers to a data area 62 representing the respective contour data are disposed in the table area 61. Although the amount of data to be processed is limited in this embodiment, there is attained an effect that the data can be accessed at a high speed when the data amount is small.

Figure 10:
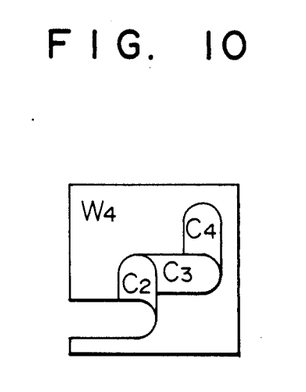
FIG. 10 is a schematic diagram useful to explain the operation of a graphic display processor.

Next, an operation example of the graphic display processor 14 is shown in FIG. 10 in which the worked state of the first block is displayed again by use of the elimination work space data of FIG. 4 and the work object space data of FIG. 5. This display can be achieved by computing the sum of sets between the final work result $W_4$ and the elimination work space data $C_2$, $C_3$, and $C_4$ associated with the first and subsequent blocks.

Next, description will be given of the set operation processor according to the present invention and an alternative embodiment of the graphic display processor.

Figure 11:
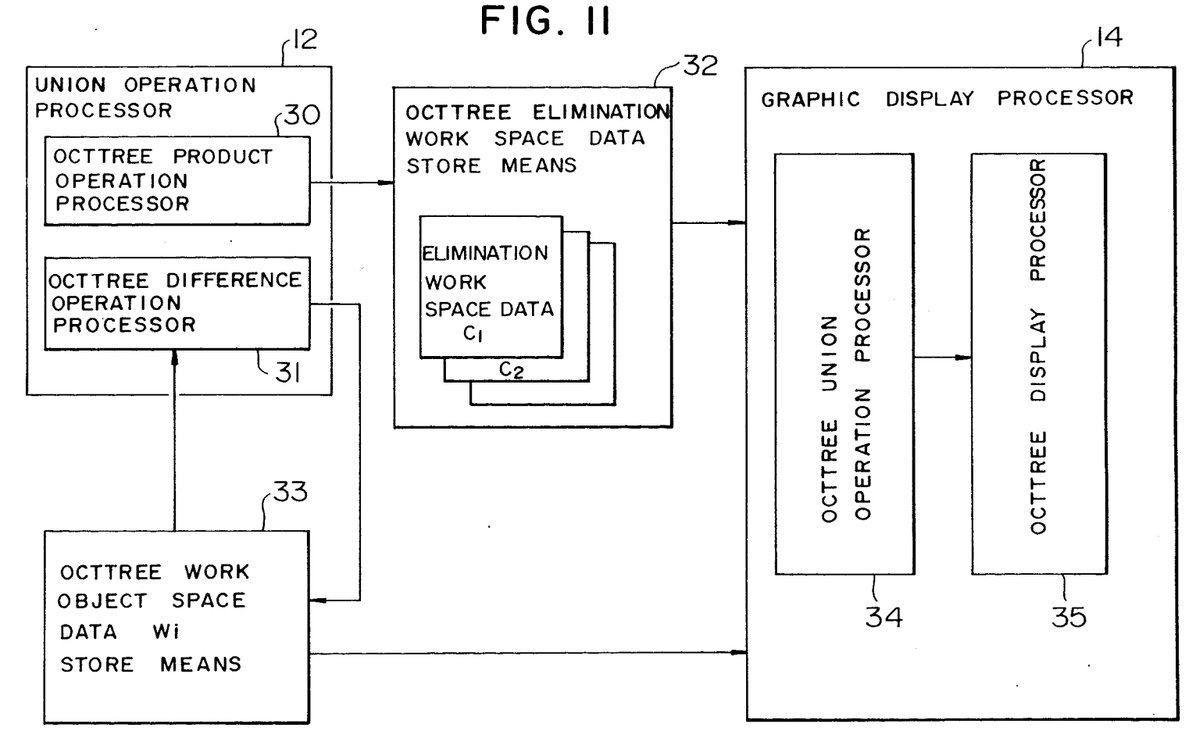
FIG. 11 is a block diagram showing the configuration of an alternative embodiment according to the present invention in a case where the contour model is represented by use of an octtree.

FIG. 11 is a block diagram showing a configuration example including the set operation processor 12 in which the contours associated with the work object space data and the work space data are represented by use of an octtree model, the two data store means 131 and 132, and the graphic display processor 14. In this embodiment, the set operation processor 12 includes an octtree product operation processor 30 and an octtree difference operation processor 31, the two data store means 131 and 132 of FIG. 11 are respectively an octtree elimination work space data store means 32 and an octtree work object space data store means 33, and the graphic display processor 14 comprises an octtree union operation processor 34 and an octtree display processor 35. Incidentally, the octtree model has been described, for example, in pages 129 to 147 of the Computer Graphics And Image Processing 19, (1982).

Figure 13A:
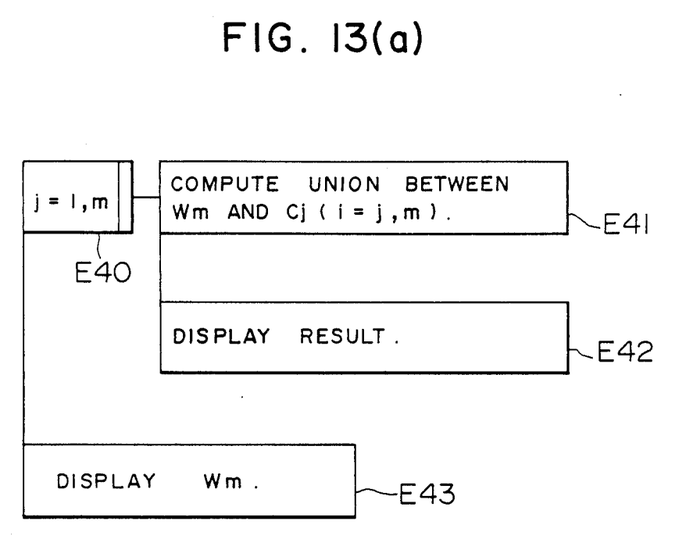
FIGS. 13(a), 13(b) and 14(a), 14(b) are flowcharts useful to explain operations of the embodiments of FIGS. 11 and 12, respectively.

Referring now to the flowchart of FIG. 13(a), description will be given of a flow of the processing in a case where the display is effected in the forward direction by use of the graphic display processor.

(1) First, j=1 is set in step E40, and then in step E41, the sum of sets or union is computed between the final work result $W_m$ and the elimination work space data $C_i$ (i=1, m) associated with the work operation units 1 to m by use of the octtree union operation processor 34 of FIG. 11, and then the result of the union is displayed in step E42. The display operation is accomplished by the octtree display processor 35, thereby displaying the first work object space data.

(2) Next, the value of j is updated to be j=2 in the step E40 so as to compute the sum of sets between the final work result $W_m$ and the elimination work space data $C_i$ (i=2, m) associated with the work operation units 2 to m, and then the result is displayed, thereby displaying the work result of the first work operation. Subsequently, the operations above are repeatedly achieved to implement the forward-directional display.

Figure 13B:
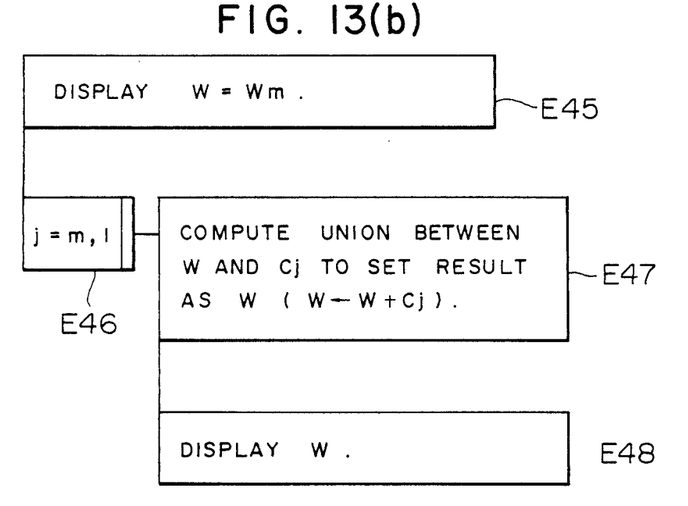

Next, referring to the flowchart of FIG. 13(b), description will be given of a flow of processing of the backward-directional display.

(1) First, in step E45, the final work result $W_m$ accumulated in the octtree work object space data store means 33 is displayed by use of the octtree display processor 35.

(2) Next, in step E47, the union is computed between the elimination work space data $C_m$ of the work operation unit m stored in the octtree elimination work space data store means 32 and the final work result $W_m$, and then the result of the union is displayed by use of the octtree display processor 35, thereby displaying the work object space data $W_{m-1}$ of the (m−1)-th operation.

(3) Subsequently, the value of j is updated in the step E46, and then in step E47, the unions of $W_m$ and $C_m$ above and the elimination work space data $C_{m-1}$ of the work operation unit (m−1) are respectively computed so as to display the result in the step E48, thereby displaying the work object space data $W_m$ of the (m−2)-th work operation. Subsequently, the back-ward-directional display can be implemented by repeatedly achieving the operations above.

In this embodiment, there is required the processing to compute the sum of sets between the octtree work object space data $W_m$ and the octtree elimination work space data $C_j$ (j=1, m); however, since $W_m$ and $C_j$ (j=1, m) are spaces which are mutually prime, the processing to attain the union can be accomplished at a very high speed. In consequence, the animation display in the forward and backward directions can be effected at a high speed.

Next, description will be given of an alternative embodiment according to the present invention in a case where the contour data is represented by use of the boundary representation (B-rep). The boundary representation, B-rep has been described, for example, in pages 88 to 90 of the Methodology of Automatic Design written by Norio Okino (Yokendo, 1982).

Figure 12:
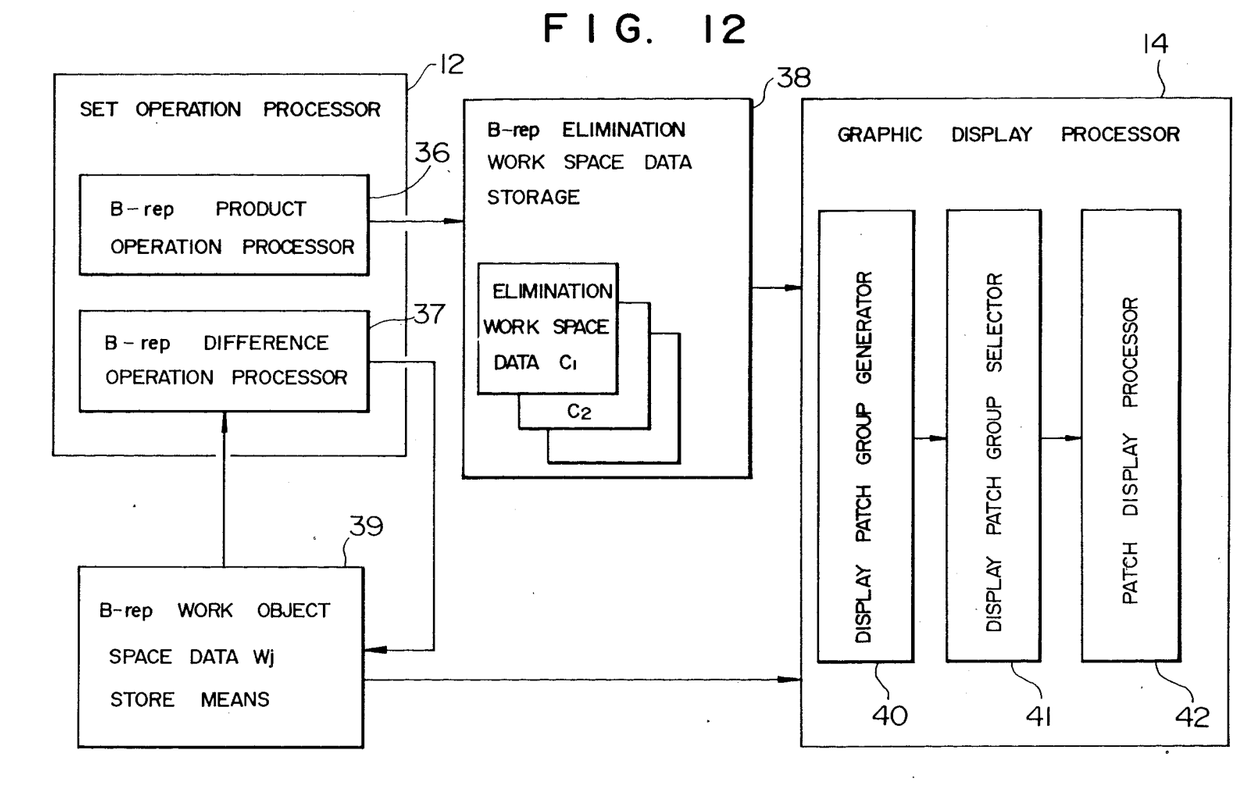
FIG. 12 is a schematic block diagram showing the configuration of an alternative embodiment according to the present invention in a case where the contour model is constituted by use of the boundary representation (B-rep)

FIG. 12 shows a configuration example of the contour data according to the boundary representation in which the set operation processor includes a B-rep product operation processor 36 and a B-rep difference operation processor 37, the data store means comprises a B-rep elimination work space data store means 38 and a B-rep work object space data store means 39, and the graphic display processor 14 includes a display patch generator 40 to generate a group of display patches from B-rep data, a patch selector 41 to select a group of patches therefrom for the display, and a patch display processor 42.

Figure 14A:
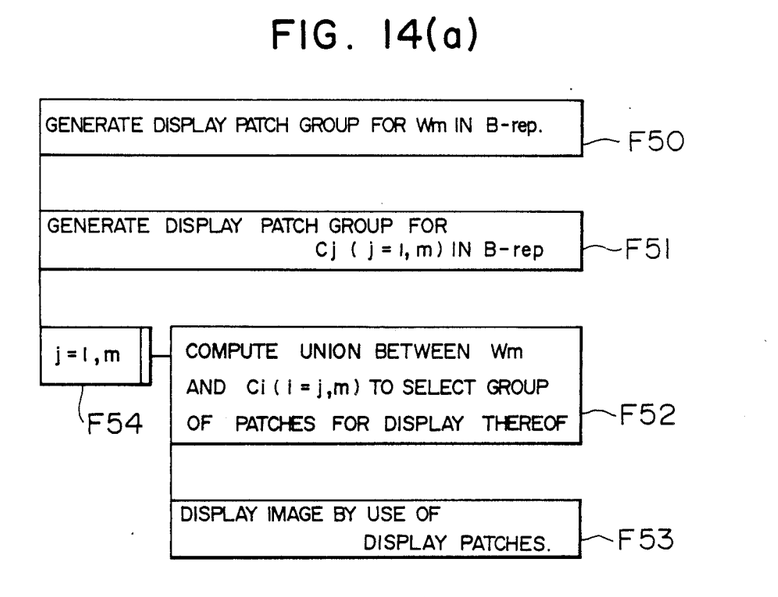

Referring now to the flowchart of FIG. 14(a), description will be given of an operation example in a case where the forward-direction display is accomplished in an elimination work simulator having the apparatus of FIG. 12.

(1) In steps F50 and F51, the final work result $W_m$ and the elimination work space data $C_j$ (j=1, m) in the boundary representation are converted into groups of display patches. The conversion is effected by the display patch group generator 40 of FIG. 12.

(2) Next, j=1 is set in step F54. In the subsequent step F52, the sum of sets is computed between $W_m$ and $C_i$ (i=j, m) in the form of converted patch groups such that a group of patches constituting the surfaces of the space represented by the sum of sets is selected by the display patch group selector 41 of FIG. 12. The selected patches are subjected to a concealed surface processing so as to be displayed in the patch display processor 42. However, since $W_m$ and $C_i$ (i=j, m) are spaces which are mutually prime, the operation to compute the sum of sets is not actually necessary, namely, surface patch data of the respective spaces need only be appropriately selected.

(3) In the step F54, the value of j is updated so as to repeatedly achieve the operations above, thereby effecting the forward-directional display.

Figure 14B:
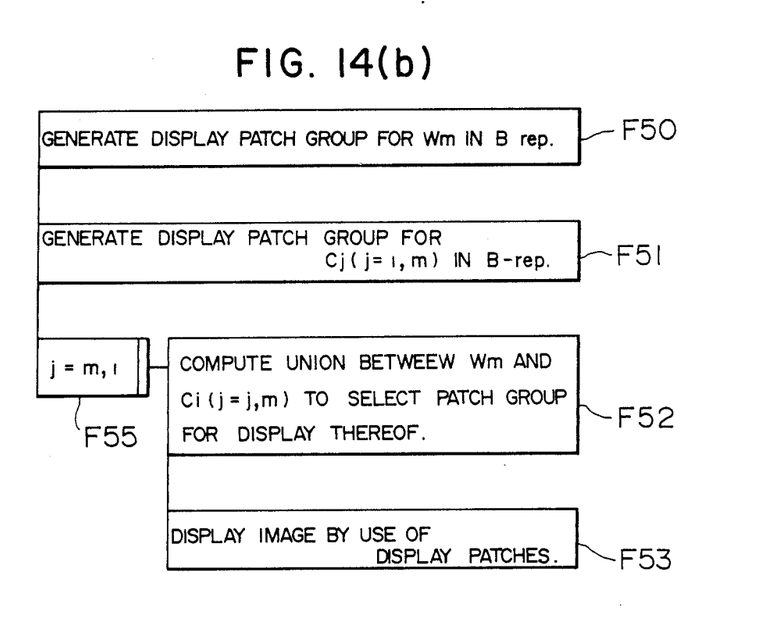

FIG. 14(b) shows an operation example of the backward-directional display. In this flowchart, the processing from the step F50 to the step F53 to obtain a group of display patches through a conversion and to select a display patch group therefrom for the display thereof is the same as that of FIG. 14(a). For the backward-directional display, the update method of the value of j in the step F55 of FIG. 14(b) is reversed as compared with that employed in the step F54 of FIG. 14(a). The method of computing the sets is here also the same as that used in FIG. 14(a).

According to the embodiment, since the worked or machined state is traced only through an appropriate selection of surface patches associated with $W_m$ and $C_i$ (i=j, m) which are mutually prime, the animation display in the forward and backward directions can be accomplished at a high speed.

Figure 15:
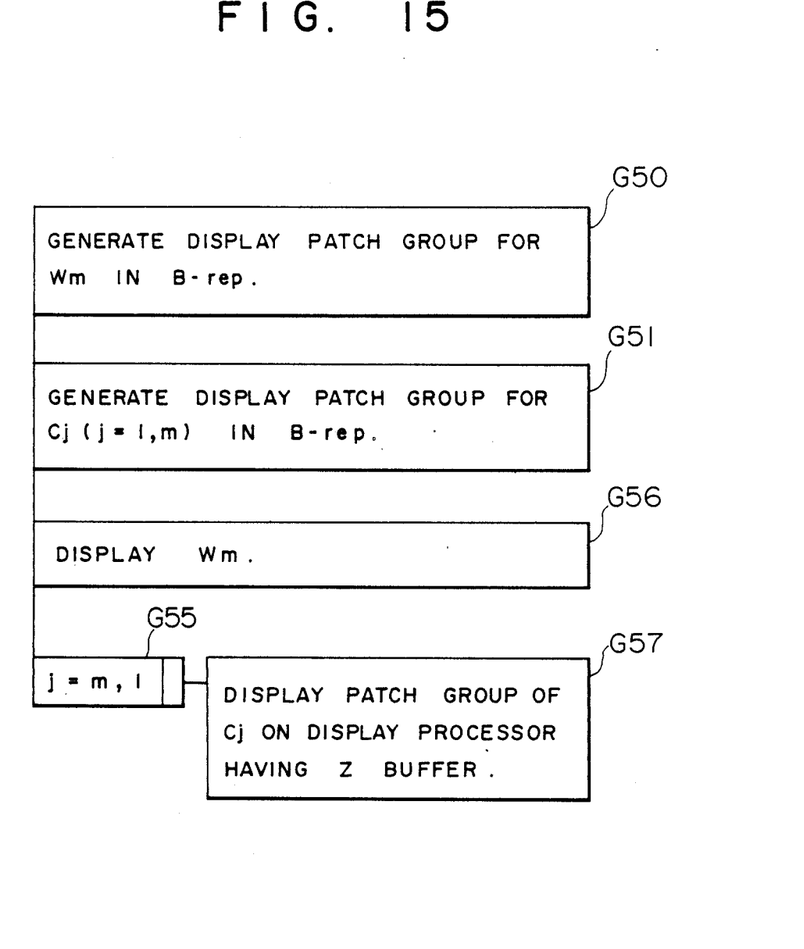
FIG. 15 is a flowchart for explaining the operation of the embodiment of FIG. 12 in a case where the graphic display is provided with a Z buffer.

FIG. 15 is a flowchart showing a backward directional display in a case where the graphic display processor includes a Z buffer so as to effect a concealed surface erase processing mechanism. According to the embodiment, owing to the characteristic of the Z buffer concealed surface processing method like that described in pages 186 to 188 of the Basic Graphic written by Kawai (Shokodo, 1985), an image as a result of the union operation can be automatically attained only by sequentially superimposing $C_i$ (i=m,j) onto $W_m$ in the drawing operation, the animation display of the worked state in the backward direction can be achieved at a very high speed.

Figure 16:
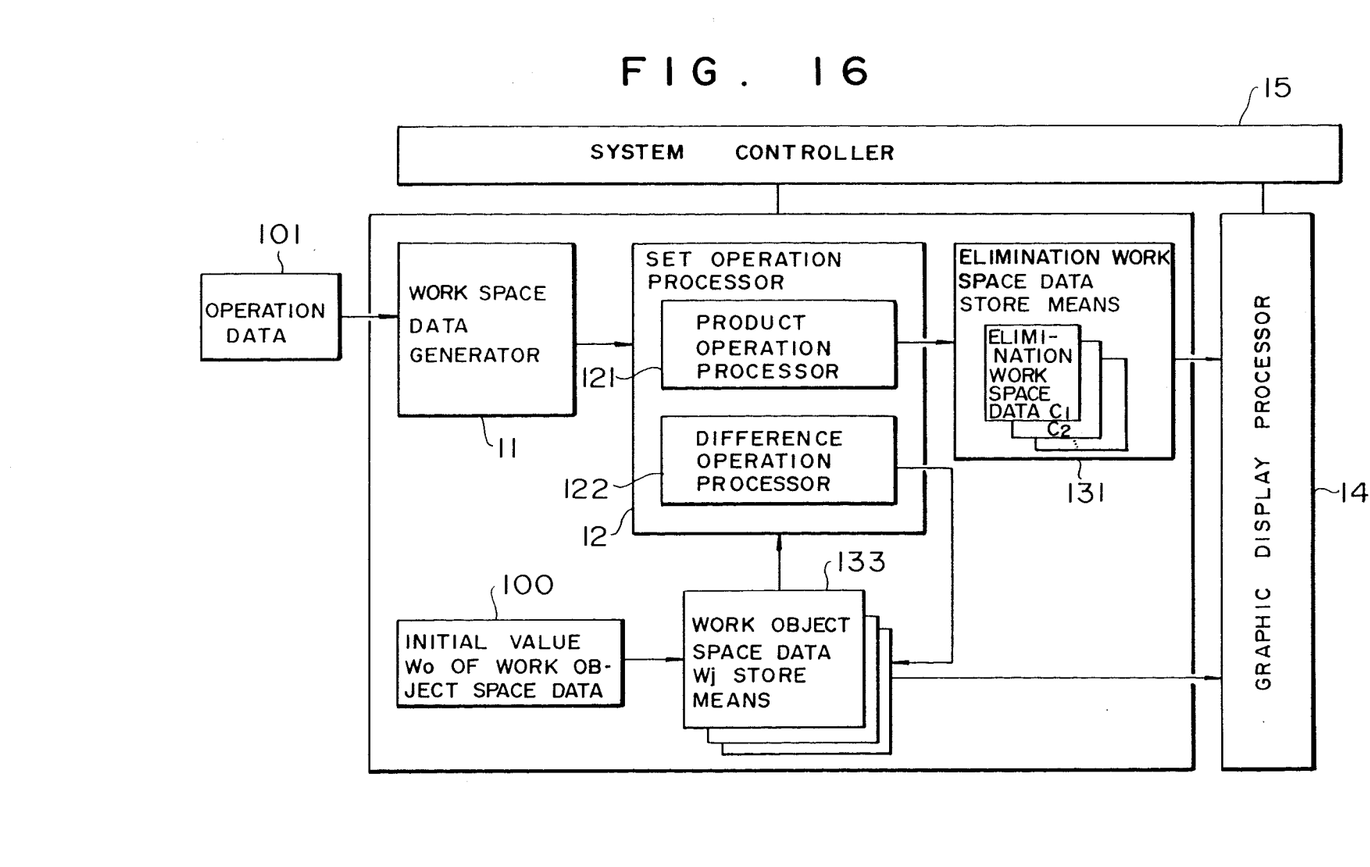
FIG. 16 is block diagram showing the configuration of an alternative embodiment according to the present invention in which intermediate results can be preserved.
Figure 17:
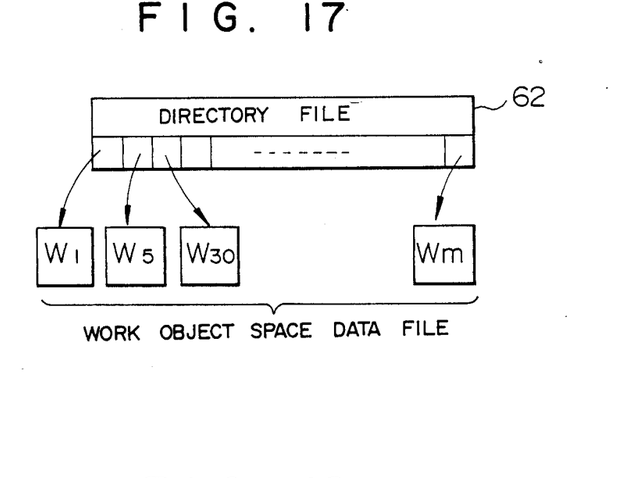
FIG. 17 is a schematic diagram showing a configuration example of means for storing work object space data in the embodiment of FIG. 16.
Figure 18:
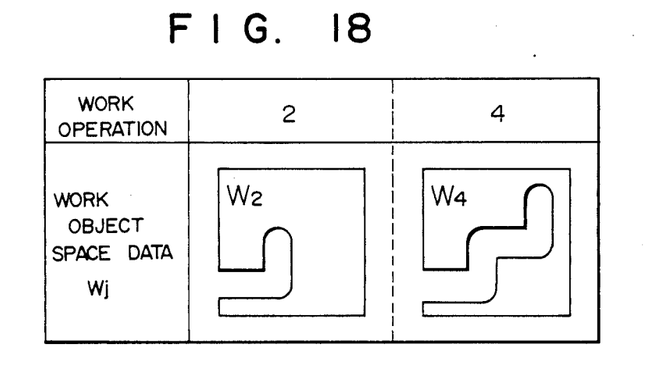
FIGS. 18 and 19 are diagrams useful to explain data in machining work processes in the embodiment of FIG. 16.
Figure 19:
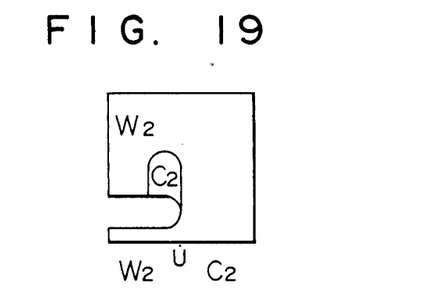

FIG. 16 is a block diagram showing an alternative embodiment according to the present invention in a case where not only the final work result $W_m$ but also the work object space data as intermediate results of the work or machine operation are preserved. In the embodiment of FIG. 16, as compared with the work object space data store means 132 of FIG. 1, there is included work object space data store means 133 designed with considerations of an accumulation of several work object space data items $W_i$ as intermediate work results. FIG. 17 shows an embodiment of a store method of storing the work object space data items $W_i$ in which several work object space data $W_i$ in the work object space data store means 133 are controlled by means of a directory file 62. In addition, FIG. 18 shows data finally accumulated in the work object space data store means 133 when the processing similar to that described in conjunction with FIG. 3 is achieved by use of the simulator of FIG. 15 so as to preserve the work object space data of the second block. Furthermore, FIG. 19 is a display example of the work object space at an intermediate point of the machine work, the display implemented by use of the accumulated data. It can be seen from FIG. 19 that the display of $W_1$ can be accomplished by use of $C_2$ selected from the elimination work space data $C_j$ (j=1, 4) of FIG. 4 and the work object space data $W_2$ of FIG. 18.

In this embodiment, as compared with a case where the work object space data at intermediate points of the work is not preserved, the number of elimination work space data items as an object of the display is decreased; consequently, the display operation can be accordingly effected at a higher speed. In addition, when compared with a case where $W_j$ of all work operation units are to be preserved, the capacity of the storage necessary for the operation is reduced, and hence there is implemented a system advantageous in two points, namely, the speed and the data amount, which leads to an effect that the animation display in the forward and backward directions can be accomplished at a very high speed.

According to the present invention, as described above, the work information accumulated in the apparatus includes the work object space data in the final operation units of the machining device and the elimination work space data of all work operation units and the space data items are mutually prime; in consequence, when compared with a method in which the work object space data of all work operation units are to be accumulated, there is attained an effect that the amount of the accumulated data is minimized.

We claim:

1. An elimination work simulator in which a work is achieved through m operation units comprising:
a first set operation processor for respectively generating a difference space between an n-dimensional work object space date $W_{j-1}$ corresponding to a work object in a jth work operation unit from among j operation units, where j=1, 2, ..., m, and an n-dimensional work space data Tj corresponding to a space through which a machining device passes in the jth work operation unit in order to provide a difference space respectively corresponding to each of the operation units, wherein n is an integer greater than or equal to 2;

first store means for storing the difference spaces as new work object space data Wj;

a second set operation processor for respectively generating a product space between the work object space data Wj−1 and the work space data Tj in order to provide a product space respectively corresponding to each of the operation units; and second store means for sequentially storing the product spaces as elimination work space data Cj.

2. An elimination work simulator according to claim 1, wherein the new work object space data Wj is used to update the work object space data Wj−1.

3. An elimination work simulator according to claim 1, wherein the work object space data Wj is stored in association with a plurality of work operation units.

4. An elimination work simulator in which a work is achieved through m operation units comprising:

a first set operation processor for respectively generating a difference space between an n-dimensional work object space data Wj−1 corresponding to a work object in a jth work operation unit from among j operation units, where j=1,2...m, and an n-dimensional work space data Tj corresponding to a space through which a machining device passes in the jth work operation unit in order to provide a difference space respectively corresponding to each of the operation units wherein n is an integer greater than or equal to 2;

first store means for storing the difference spaces as new work object space data Wj;

a second set operation processor for respectively generating a product space between the work object space data Wj−1 and the work space data Tj in order to provide a product space respectively corresponding to each of the operation units;

second store means for sequentially storing the product spaces as elimination work space data Cj; and a graphic display processor for displaying work object space data Wk−1 in an arbitrary work operation unit k, where k≦j, by use of the new work object space data Wj stored in said first store means and at least a portion of a group of elimination work space data $C_i$, where i≦j, previously stored in said second store means.

5. An elimination work simulator according to claim 4, wherein said set operation processors, said store means, and said graphic display processor are respectively octtree apparatuses.

6. An elimination work simulator according to claim 4, wherein the work space data Tj is represented through use of a boundary representation model.

7. An elimination work simulator according to claim 4, wherein an animation display of the work object space data Wj is effected in an order corresponding to a performance order of performed work operations.

8. An elimination work simulator according to claim 4, wherein an animation display of the work object space data Wj is effected in an order corresponding to a reverse performance order of performed work operations.

9. An elimination work simulator according to claim 1, wherein said second store means accumulates said sequentially stored product spaces.

10. An elimination work simulator according to claim 4, wherein said second store means accumulates said sequentially stored product spaces.

11. An elimination process simulator for simulating a process involving m operations comprising:

a first set operation processor for respectively generating a remainder portion data representing a remainder portion corresponding to an n-dimensional work object to be processed in a jth operation from among j operations, where j= 1, 2, ..., m, less an n-dimensional work object portion corresponding to a space through which a machining device passes in the jth operation in order to provide a remainder portion data respectively corresponding to each of the operations, wherein n is an integer greater than or equal to 2;

first store means for storing the remainder portion data corresponding to each of the operation units as updated remainder portion data;

a second set operation processor for respectively generating an overlap portion data representing an overlap portion corresponding to an intersection between the n-dimensional work object to processed in the jth operation and the space through which the machining device passes in the jth operation in order to provide an overlap portion data respectively corresponding to each of the operations; and second store means for sequentially storing the overlap portion data as elimination work space data Cj.

12. An elimination process simulator according to claim 11, wherein the updated remainder portion data is used to update the remainder portion data.

13. An elimination process simulator according to claim 11, wherein the remainder portion data is stored in association with a plurality of work operations.

14. An elimination processor simulator for simulating a process involving m operations comprising:

a first set operation processor for respectively generating a remainder portion data representing a remainder portion corresponding to an n-dimensional work object to be processed in a jth operation from among j operations, where j= 1, 2, ..., m, less an n-dimensional work object portion corresponding to a space through which a machining device passes in the jth operation in order to provide a remainder portion data respectively corresponding to each of the operation, wherein n is an integer greater than or equal to 2;

first store means for storing the reminder portion data corresponding to each of the operation units as updated remainder portion data;

a second set operation processor for respectively generating an overlap portion data representing an overlap portion corresponding to an intersection between the n-dimensional work object to be processed in the jth operation and the space through which the machining device passes in the jth operation in order to provide an overlap portion data respectively corresponding to each of the operations;

second store means for sequentially storing the overlap portion data as elimination work space data Cj; and a graphic display processor for displaying an n-dimensional work object to be processed in a kth operation, where k is an integer less than or equal to j, by using the updated remainder portion data stored in said first store means and at least a portion of elimination work space data $C_i$, where i is an integer less than or equal to j, previously stored in said second store means.

15. An elimination process simulator according to claim 14, wherein said set operation processors, said store means, and said graphic display processor are respectively octtree apparatuses.

16. An elimination process simulator according to claim 14, wherein the data corresponding to the space through which the machining device passes in the jth operation is represented by using a boundary representation solid model.

17. An elimination process simulator according to claim 14, wherein an animation display of the updated remainder portion data is effected in an order corresponding to a performance order of the work operations.

18. An elimination process simulator according to claim 14, wherein an animation display of the updated remainder portion data is effected in an order corresponding to a reverse performance order of the work operations.

19. An elimination process simulator according to claim 11, wherein said second store means accumulates said sequentially stored overlap portion data.

20. An elimination process simulator according to claim 14, wherein said second store means accumulates said sequentially stored overlap portion data.

* * * * *